United States Patent [19]

Hoch

[11] Patent Number: 5,427,216
[45] Date of Patent: Jun. 27, 1995

[54] CONTROL LINKAGE FOR A HYDROSTATIC TRANSMISSION

[75] Inventor: John J. Hoch, Columbus, Wis.
[73] Assignee: Deere & Company, Moline, Ill.
[21] Appl. No.: 94,796
[22] Filed: Jul. 20, 1993
[51] Int. Cl.$^6$ ............................................. B60K 41/26
[52] U.S. Cl. ............................ 192/4 A; 192/4 C; 74/483 K
[58] Field of Search ................ 192/4 R, 4 A, 4 C; 74/483 K, 473 R

[56] References Cited

U.S. PATENT DOCUMENTS

| | | | |
|---|---|---|---|
| 3,710,904 | 1/1973 | Boyer et al. | 192/4 A |
| 3,972,249 | 8/1976 | Hansem | 74/526 |
| 4,064,766 | 12/1977 | Rinaldo | 74/473 R |
| 4,125,034 | 11/1978 | Wineburner | 74/471 |
| 4,228,879 | 10/1980 | Woodbury | 192/4 A |
| 4,248,331 | 2/1981 | Behrens | 192/13 R |
| 4,281,737 | 8/1981 | Molzahn | 192/4 A X |
| 4,296,846 | 10/1981 | Benson | 192/4 A |
| 4,298,108 | 11/1981 | Hutchison | 74/483 R X |
| 4,491,209 | 1/1985 | Bening | 192/4 A |
| 4,496,035 | 1/1985 | Wanie | 192/4 C |
| 4,646,582 | 3/1987 | Kimijima | 74/473 R |
| 4,759,417 | 7/1988 | Wanie et al. | 180/6.34 |
| 4,771,856 | 9/1988 | Hutchison et al. | 180/333 |
| 4,799,397 | 1/1989 | Egidi et al. | 74/473 R |
| 4,883,137 | 11/1989 | Wanie et al. | 180/6.34 |
| 5,022,477 | 6/1991 | Wanie | 180/6.34 |
| 5,040,649 | 8/1991 | Okada | 192/4 A |
| 5,048,638 | 9/1991 | Duncan et al. | 180/307 |
| 5,062,510 | 11/1991 | Shimizu | 192/4 C |
| 5,094,326 | 3/1992 | Schemelin et al. | 192/4 A X |
| 5,096,032 | 3/1992 | Hutchison et al. | 192/4 A |
| 5,152,382 | 10/1992 | Hoch et al. | 192/4 R |

OTHER PUBLICATIONS

Parts Catalog entitled "170, 175, 180 and 185 Lawn Tractors", published by Deere & Co. in the U.S., pp. 50-28 and 50-29, Nov. 1989.

Primary Examiner—Andrea L. Pitts

[57] ABSTRACT

A hydrostatic transmission control mechanism includes a hand lever engagable by an operator, and a member to which the hand lever is directly mounted. The member is pivotally mounted to the vehicle and is operatively coupled with the transmission for adjusting the speed of the vehicle as the operator shifts the hand lever. The member includes a generally curved and concave cam surface which interacts with a neutral return cam follower to provide a relatively large effective lever arm extending between the member's pivot axis and the direction of force applied to the cam surface by the cam follower when the member is in positions corresponding to high vehicle velocity, thereby allowing the member to be pivoted back to its neutral position with only a relatively small force.

15 Claims, 4 Drawing Sheets

CONTROL LINKAGE FOR A HYDROSTATIC TRANSMISSION

BACKGROUND OF THE INVENTION

1. Field of the Invention

The invention relates to control linkages for hydrostatic transmissions, and the neutral return mechanisms such linkages provide.

2. Description of the Related Art

It is known to provide conventional lawn tractors with hydrostatic transmissions. These transmissions typically have an input means or input shaft which extends outwardly from the transmission housing. When this shaft is pivoted in a first direction from a neutral position the transmission propels the tractor in a forward direction, and when the input shaft is pivoted in the other direction the transmission propels the tractor in reverse. The degree to which the input means is pivoted, either in the forward or reverse direction, controls the velocity of the tractor. An operator control such as a foot pedal or hand lever is typically coupled to the end of a linkage which extends between the shaft and the operator station. The operator control is thereby shiftable by the operator for controlling the direction and speed of the vehicle.

Some such vehicles having hydrostatic transmissions provide mechanisms which automatically return the shaft to its neutral position in situations such as when the operator removes his foot from an accelerator pedal or when the operator applies a vehicle brake. By returning the shaft to its neutral position, the hydrostatic transmission is allowed to free-wheel instead of continuing to drive or propel the vehicle when the operator lifts his foot from the accelerator or when the operator applies the brake.

Typical neutral return mechanisms include a plate having a V-shaped cam surface formed therein. Typically the plate is operatively coupled for pivotal motion with the transmission input shaft. A cam follower is provided which is selectively urged against the V-shaped cam surface for returning the pivoted plate and input shaft to their neutral position. As the cam follower presses against one of the legs of the V-shaped cam surface the plate will pivot back to its neutral position, and the cam follower will come to rest near the base of the V where the two legs meet. Due to the V shape of the cam the roller can make proper contact with the cam when the cam is pivoted in either the forward or the reverse directions. The roller is therefore capable of returning the transmission to neutral regardless of the vehicle's direction of travel.

Conventional neutral returns typically include a generally large number of parts and thereby undesirably add to the cost of manufacturing the vehicle. It would be desirable to provide a vehicle having a hydraulic transmission with a neutral return feature composed of relatively few parts and which is relatively inexpensive to manufacture. Some conventional neutral return mechanisms require a large amount of force be applied to the plate by the cam follower in order for the plate to pivot back to its neutral position. It would therefore be desirable to provide a neutral return mechanism which returns the plate to its neutral position without requiring a large force being applied by the cam follower. Ease of operation and operator feel would thereby be enhanced.

SUMMARY OF THE INVENTION

The preferred embodiment of the present invention provides a linkage for controling a hydrostatic transmission of a vehicle. An operator of the vehicle can shift a hand lever which, via the linkage, pivots an input shaft which controls the transmission. The linkage includes a member pivotally mounted to the vehicle. The hand lever is mounted directly to the member. The member also defines an opening which serves as a neutral return cam surface. As the operator depresses a brake pedal a cam follower or peg shifts against the cam surface defined by the pivotal member. The force of the peg pressing against the cam surface urges the member back to its neutral position. The peg and cam surface thereby act to return the member and the transmission input shaft to their neutral position when the operator applies the brake. The transmission therefore will free-wheel when the brakes are applied instead of continuing to drive the vehicle. The opening in the member includes first and second cam surfaces which form a generally V-shaped cam surface. The amount of force which must be applied by the peg upon the cam surface in order to pivot the member back to its neutral position is dependent upon the effective lever arm or moment arm which extends between the member's pivot axis and the force being applied to the member by the peg. The first cam surface is generally curved and defines a concave surface against which the peg abuts when the vehicle is traveling forward and the brake is applied. The curvature of the first cam surface results in relatively large lever arms being created as the peg abuts the first cam surface, even when the peg abuts the first cam surface near the rear of the member during high forward speeds. The operator is therefore required to apply only relatively small amounts of force to the brake pedal to return the member to its neutral position when the vehicle is travelling at relatively high forward speeds.

DESCRIPTION OF THE PREFERRED EMBODIMENT

Figure 1:
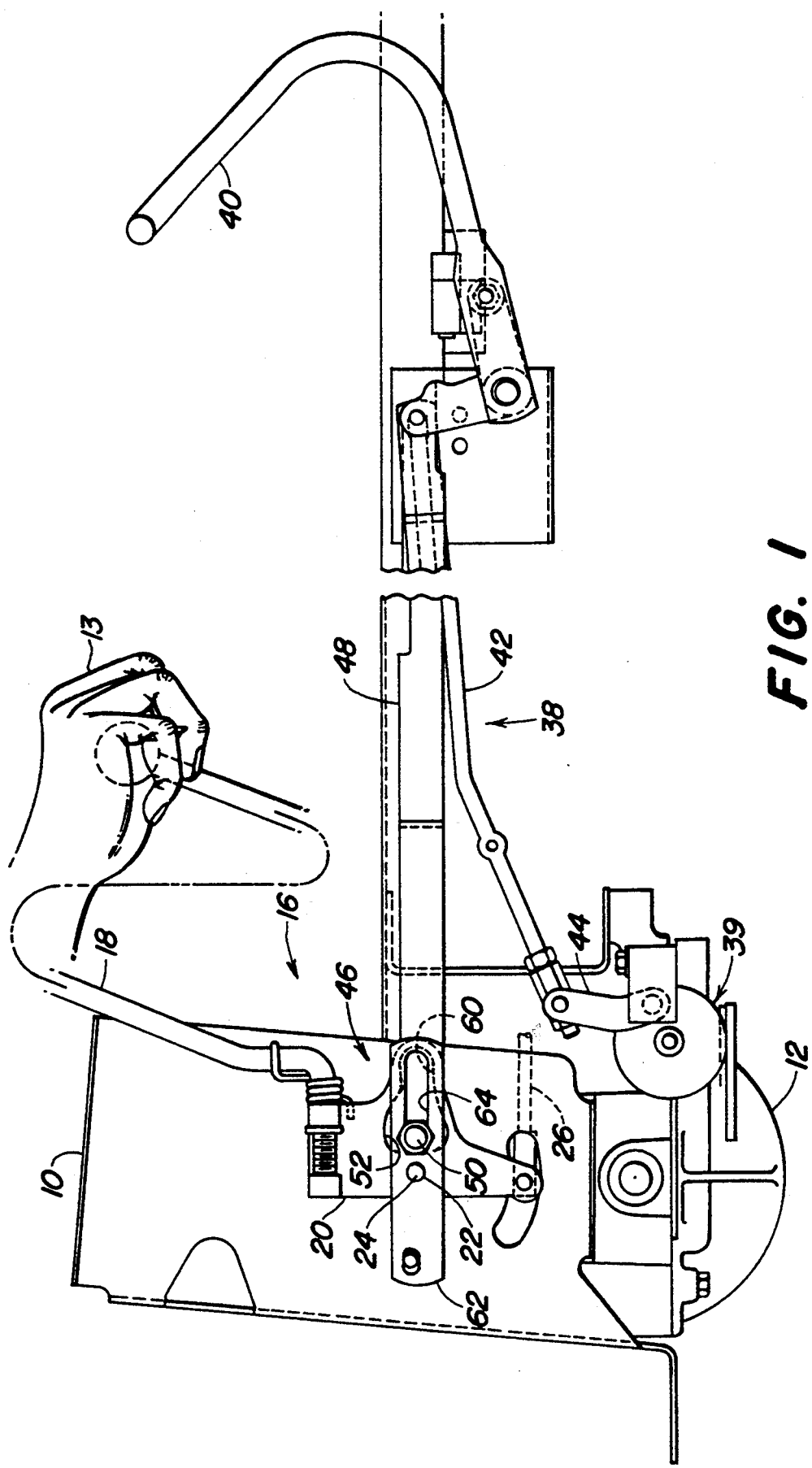
FIG. 1 is a partial side view of the linkage according to the preferred embodiment of the present invention with the transmission and member in a neutral mode and the brake pedal disengaged.
Figure 2:
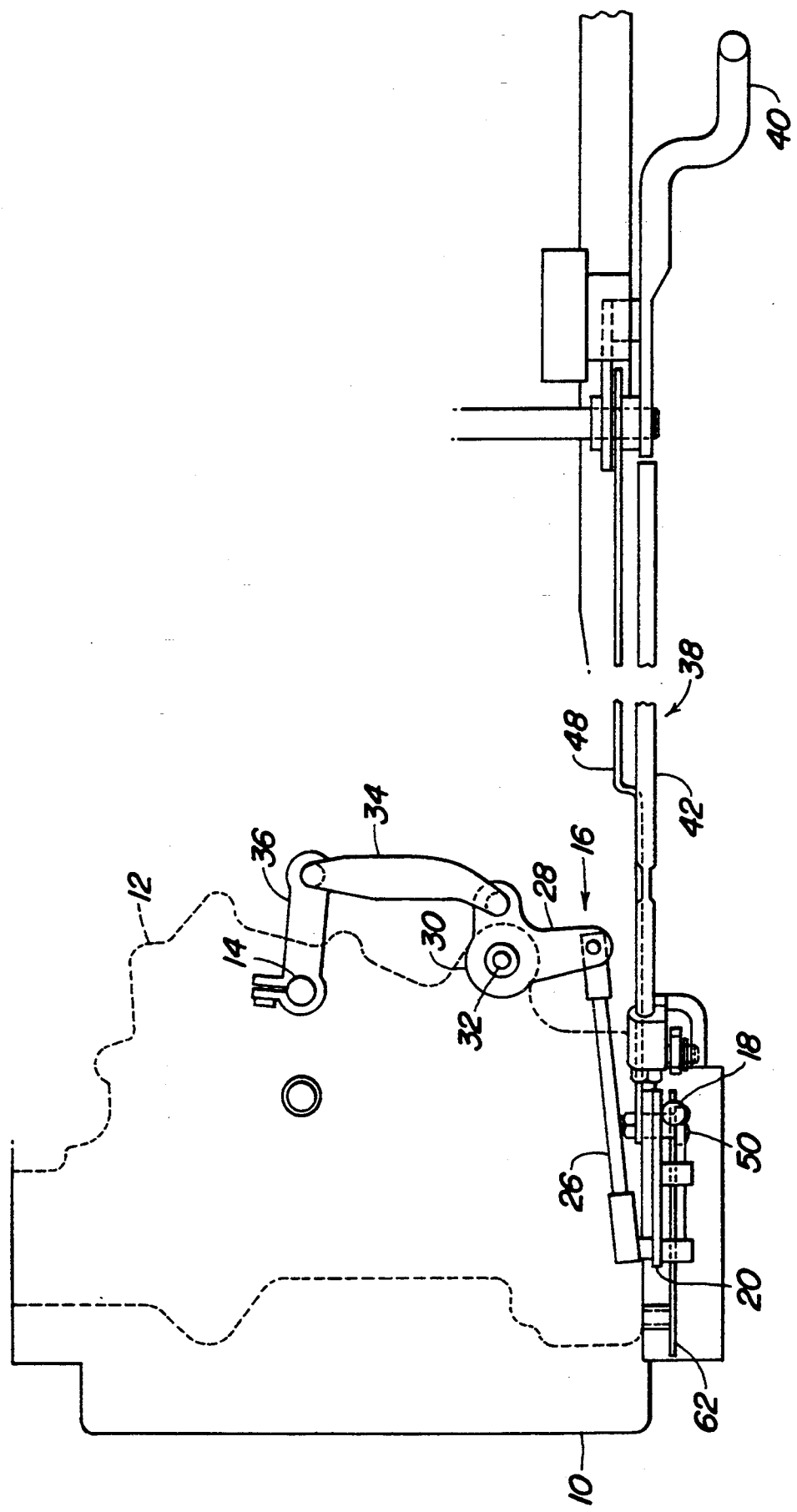
FIG. 2 is a partial plan view of the linkage according to the preferred embodiment.

The preferred embodiment of the present invention is shown in FIGS. 1–5, and is used for controlling a hydrostatic transmission of a lawn and garden tractor vehicle. The vehicle includes a frame 10 and ground engaging driven wheels. A hydrostatic transmission 12 transmits rotational power from the vehicle engine to the ground engaging wheels for propelling the vehicle across the ground. The transmission 12 includes an input shaft 14 which controls the operational mode of the transmission 12. When the shaft 14 is pivoted clockwise from its neutral position the vehicle is propelled in the forward direction. As the shaft 14 is pivoted further in the clockwise direction the vehicle attains higher and higher speeds. When the transmission input shaft 14 is pivoted in the counterclockwise direction from its neutral position the vehicle is propelled in reverse. As the input shaft 14 is pivoted further in the counterclockwise direction the vehicle attains higher and higher speeds in the reverse direction.

The preferred embodiment provides a linkage 16 which allows an operator 13 to control the transmission 12 from an operator's station or seat. A hand lever 18 extends upwardly through a quadrant or slot formed in a rear fender of the vehicle. The hand lever 18 is pivotally mounted to and supported by a member 20. The member 20 is pivotally coupled with the frame 10 of the vehicle via a bolt mechanism 22. The bolt 22 defines a horizontally and laterally extending pivot axis 24 about which the member 20 pivots during operation. The rear portion of a link rod 26 is operatively coupled with the lower portion of the member 20, and the front portion of the link rod 26 is coupled with a bell crank 28 of a friction disk mechanism 30. The friction disk mechanism 30 creates resistance which hinders the lever 18 from being shifted too easily, and also hinders the transmission 12 from shifting from the operating speed selected by the operator. The resistance applied by the friction disk 30 can be adjusted by tightening or loosening a nut 32. A pair of link members 34 and 36 extend between the bell crank 28 and the transmission input shaft 14. The linkage 16 thereby extends between the hand lever 18 and the transmission input shaft 14 for allowing the operator to easily control the transmission 12 while seated in the operator station.

The vehicle also includes a brake mechanism 38. A foot pedal 40 is provided which can be depressed by the operator to activate the vehicle brake 39. A brake rod 42 extends rearwardly from the brake pedal 40 and is coupled with an arm 44 of the vehicle brake 39. As the operator depresses the brake pedal 40 the brake rod 42 shifts forwardly which causes the arm 44 to pivot forwardly and actuate the brake 39.

Figure 3:
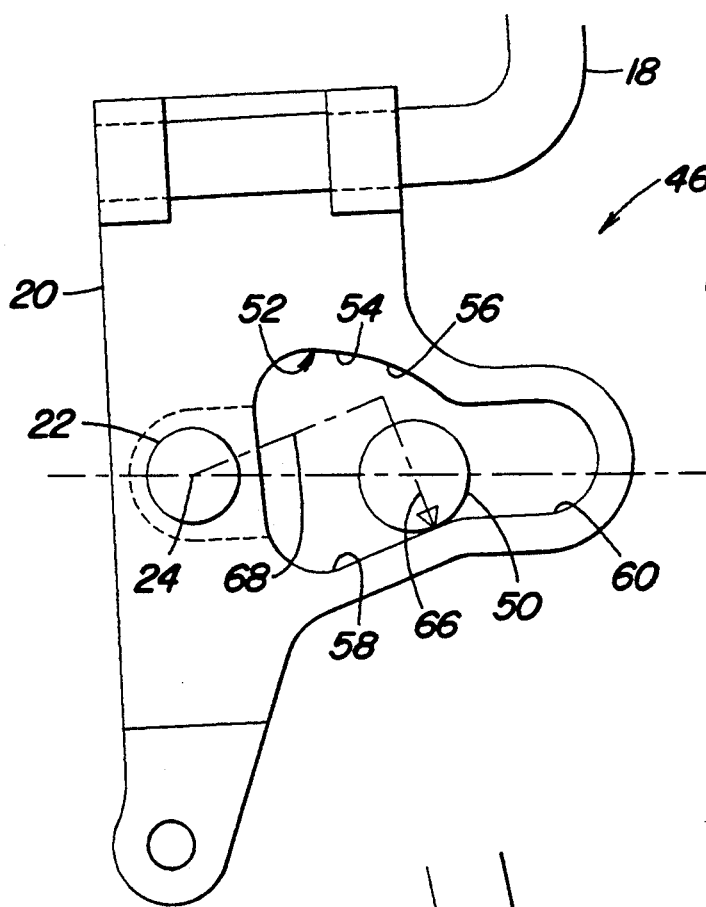
FIG. 3 is a partial side view showing the member in a pivoted position corresponding with slow travel in reverse and showing the cam follower in abutment with the second cam surface as when the brake pedal is being applied.
Figure 4:
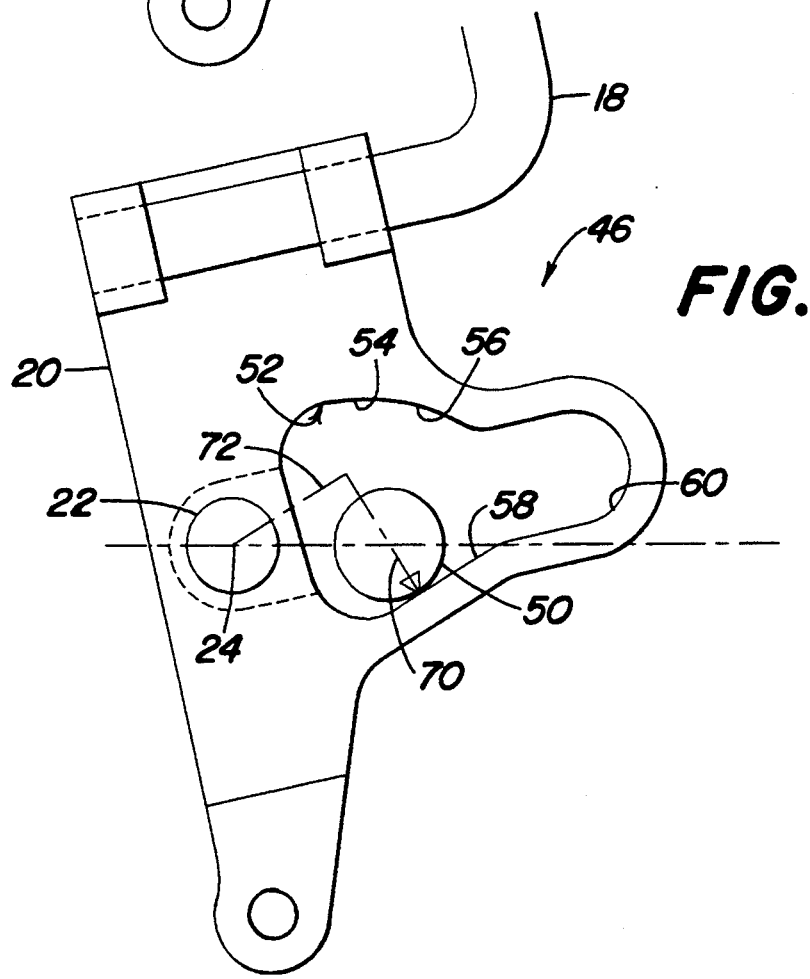
FIG. 4 is a partial side view showing the member in a pivoted position corresponding with higher speeds in the reverse direction, and showing the cam follower in abutment with the second cam surface as when the brake pedal is being applied.
Figure 5:
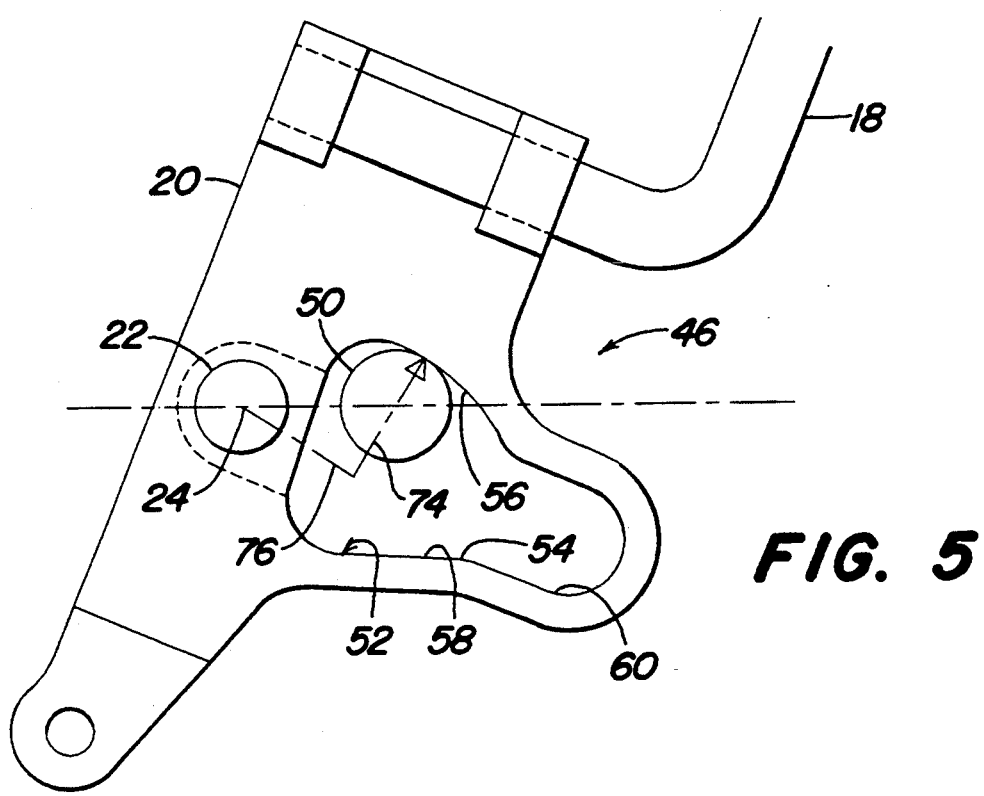
FIG. 5 is a partial side view showing the member in a pivoted position corresponding with relatively high speeds in the forward direction, and showing the cam follower in abutment with the first cam surface as when the brake pedal is being applied.

A neutral return mechanism 46 is provided by the preferred embodiment of the present invention. The neutral return mechanism 46 interconnects the brake linkage 38 and the transmission control linkage 16, and serves to position the transmission 12 in its neutral mode when the brake pedal 40 is depressed by the operator. A strap 48 extends rearwardly from the brake pedal 40, and shifts fore and aft with the brake pedal 40 as the operator manipulates the brake pedal 40. A peg or cam follower 50 mounted on the rear end portion of the strap 48 is positioned within an opening 52 formed in the member 20. The opening 52 (as best seen in FIGS. 3-5) serves to define a cam surface 54 against which the peg 50 abuts to pivot the member 20 back to its neutral position when the brake pedal 40 is depressed. First and second cam surfaces 56 and 58 generally define a V shape. The first cam surface 56 has a generally curved, concave shape, which will be described in more detail below. A slot 60 is formed where the first and second cam surfaces 56 and 58 converge. A plate 62 (as seen in FIG. 1) rigidly coupled with the frame 10 defines a longitudinally extending slot 64 within which the peg 50 shifts as the brake pedal 40 is depressed. The slot 64 in the plate 62 guides the peg 50 as it shifts back and forth, maintains the peg 50 in proper alignment during shifting and prevents the peg 50 from falling or shifting out of the opening 52 in the member 20.

Next, the operation of the present invention will be discussed in greater detail. To initiate forward vehicle travel, the operator pivots the hand lever 18 forwardly. The member 20 to which the lever 18 is mounted thereby pivots clockwise from the position shown in FIG. 1 and about its pivot axis 24. The resulting pivoting of the input shaft 14 causes the vehicle to be propelled forwardly. The cam follower 50 is positioned in the rear portion of the opening 52 in the member 20 and therefore clearance is provided for the member 20 to pivot. When the operator wishes to slow the vehicle he depresses the brake pedal 40, which shifts the brake rod 42 forwardly to actuate the vehicle brake 39. Depression of the brake pedal 40 also causes the strap 48 to shift forwardly and the cam follower 50 to shift forwardly within the opening 52. As the cam follower 50 shifts forwardly it presses against the first cam surface 56 and shifts the member 20 counterclockwise to its neutral position. As the operator continues to depress the brake pedal 40 the cam follower 50 enters the slot 60 formed by the opening 52. At this point the member 20 and transmission input shaft 14 have fully returned to their neutral position. The slot 60 serves to capture the cam follower 50 and prevent the member 20 from shifting until the cam follower 50 shifts out of the slot 60 and to the rear of the opening 52. The operator is thereby prevented from shifting the hand lever 18 to a driving mode until the brake pedal 40 is released. A parking brake feature may be provided which can be engaged by the operator to secure the brake pedal 40 in its depressed position. The slot 60 therefore also acts to prevent or block the hand lever 18 and member 20 from being shifted to a driving mode while the parking brake is applied. When the brake pedal 40 is disengaged the strap 48 shifts rearwardly and the peg 50 shifts to the relatively wide rear portion of the opening 52. Clearance is thereby provided for shifting the member 20 from its neutral position and again driving the vehicle.

The preferred embodiment functions in a similar fashion in reverse. The operator shifts the hand lever 18 rearwardly to initiate reverse travel. The member 20 therefore pivots in the counterclockwise direction from the neutral position shown in FIG. 1, and the transmission input shaft 14 pivots to a corresponding reverse mode. When the brake pedal 40 is engaged by the operator during reverse travel the cam follower 50 shifts forwardly within the slot 60 and abuts the second cam surface 58 for pivoting the member 20 clockwise back to the neutral position.

The hand lever 18 is pivotal with respect to the member 20 about a generally horizontal, fore and aft extending axis. The hand lever 18 shifts within a slot or quadrant (not shown) formed in the vehicle fender. The slot has a fore and aft extending front portion associated with forward vehicle travel, a laterally extending middle portion associated with the neutral mode, and a fore and aft extending rear portion associated with reverse travel. The forward and reverse portions of the slot are not aligned with each other, and therefore the operator must pivot the hand lever 18 laterally within the neutral middle portion of the slot when he shifts between forward and reverse directions of travel.

The member 20 serves as the mounting mechanism which supports the hand lever 18 during operation. It also defines the cam surfaces 54 which act to return the transmission 12 to a neutral mode when the brake 39 is engaged. The member 20 therefore serves the dual purpose of providing a mounting means for the hand lever 18 and defining a neutral return cam surface 54. The number of parts is thereby further reduced and the manufacturing costs of the vehicle are correspondingly reduced. The cam surface 54 is formed within a part which is one of the linkages which extend between the transmission input shaft 14 and the hand lever 18. The number of parts required by the preferred embodiment is therefore relatively small since a separate linkage structure having a neutral return cam surface is not required.

The second cam surface 58 is generally flat or straight. When the vehicle is traveling in reverse and the operator applies the brake pedal 40, the peg 50 will shift forwardly and contact the second cam surface 58 and pivot the member 20 clockwise toward its neutral position. The peg's ability to pivot the member 20 back to its neutral position is dependant on the amount of force applied by the peg 50 to the cam surface 54 and the size of the lever arm or moment arm applied by the peg 50 to pivot the member 20. The amount of force applied by the peg 50 to the cam surface 54 is determined by the amount of force exerted by the operator on the brake pedal 40. The size or length of the lever arm or moment arm which acts to pivot the member 20 back to the neutral position is equal to the perpendicular distance between the member's pivot axis 24 and the direction of the force applied by the peg 50 to the cam surface 54. The round peg 50 applies a force to the cam surface 54 in a direction normal to the cam surface 54 at the location at which the peg 50 is contacting the cam surface 54.

When traveling slowly in reverse, the member 20 has not pivoted very far from its neutral position, and therefore the peg 50 will initially contact the second cam surface 58 near the slot 60 when the brake is applied, as seen in FIG. 3. When the peg 50 is contacting the second cam surface 58 near the slot 60, the line of force 66 which is applied by the peg 50 to the second cam surface 58 does not extend very close to the pivot axis 24 of the member 20, and the effective lever arm 68 is relatively large. Therefore it is relatively easy for an operator to apply the brake 39 when traveling at low speeds in reverse.

When the operator applies the brake pedal 40 while traveling at higher speeds in reverse the peg 50 will initially contact the second surface 58 nearer the rear of the member 20, as shown in FIG. 4. As stated above, the force is applied by the peg 50 to the second cam surface 58 along a line 70 which is normal to the second cam surface 58 at that location. This line of force 70 extends closer to the member's pivot axis 24 than the line of force 66 (shown in FIG. 3) applied when the peg 50 contacts the second cam surface 58 near the slot 60. Since the effective lever arm 72 is smaller near the rear of the second cam surface 58 a greater force must be applied to the second cam surface 58 by the peg 50 when the vehicle is traveling at the higher reverse speeds. Therefore, when traveling at the higher reverse speeds, the operator must apply a greater force to the brake pedal 40 to pivot the member 20 back to the neutral position. However, only relatively small velocities can be attained in reverse, and therefore the force the operator must apply to the brake pedal 40 remains sufficiently small.

However, the vehicle can attain higher speeds in the forward direction than in reverse. Therefore, the effective lever arm which would exist when the vehicle is traveling quickly in the forward mode would be undesirably small if the first cam surface 56 were flat like the second cam surface 58. This would make it relatively difficult for an operator to depress the brake pedal 40 when the vehicle transmission 12 is in a high forward speed mode. The first cam surface 56 of the present invention is generally curved to define a concave configuration. As seen in FIG. 5, when the operator depresses the brake pedal 40 while traveling forward at high speeds the peg 50 will initially contact the first cam surface 56 near the rear of the member 20. The force 74 applied by the peg 50 to the first cam surface 56 is directed along a line normal to the first cam surface 56 at the point where the peg 50 contacts the cam surface 56. Since the first cam surface 56 is curved, the line of force 74 applied by the peg 50 to the first cam surface 56 near the rear of the member 20 does not extend very close to the pivot axis 24. Therefore the effective lever arm 76 is relatively large, and only a small force must be applied to the brake pedal 40 by the operator. On the other hand, if the first cam surface 56 extended in a straight or flat line from the slot 60, the normal lines extending from the rear portion of the flat first cam surface would be closer to the member's pivot axis 24, which would result in relatively small lever arms. The curved first surface 56 helps maintain a relatively large lever arm even when the peg 50 is contacting the rear portion of the first surface 56. Since the effective lever arm 76 is relatively large when the peg 50 contacts the first cam surface 56 near the rear of the member 20, only a relatively small force is required of the operator in order to depress the brake pedal 40 when traveling at high forward speeds.

When traveling at relatively low forward speeds the peg 50 will initially contact the first cam surface 56 near the slot 60 when the brake 40 is applied. As discussed above in the discussion of the second cam surface 58, the effective lever arm which exists when the peg 50 contacts the first surface 56 near the slot 60 is relatively large. Therefore only a relatively small force is required of the operator to depress the brake pedal 40.

I claim:

1. A hydrostatic transmission control mechanism, comprising:

a hydrostatic transmission input shiftable to control said transmission, a member operatively coupled with said input for selectively pivoting the input, said member having a pivot axis about which the member pivots for shifting the input, said member having first and second surfaces which form a generally V-shaped cam surface, said first surface being generally curved to define a generally concave cam surface, a slot formed in the member and having an opening formed where said first and second surfaces generally converge, said first and second surfaces terminating at the opening of the slot, a cam follower operatively coupled with a brake control and linearly shiftable for applying a force to the cam surfaces for pivoting the member to a neutral position when a brake is applied, and such that the cam follower enters the opening in the slot when the member has pivoted to the neutral position.

2. The invention of claim 1, wherein an effective moment arm is established between the member's pivot axis and the force applied to the cam surface by the cam follower, said curvature of the concave cam surface serving to establish a relatively large effective moment arm when the cam follower engages the first surface at high vehicle speeds.

3. The invention of claim 2, and further including a lever mounted directly to the member, said lever being engagable by a vehicle operator for pivoting the member and selectively controlling the speed of the vehicle.

4. The invention of claim 2, and further comprising a plate having a linearly extending slot formed therein, said cam follower being generally confined within said slot for defining a linear path of motion of the cam follower.

5. The invention of claim 1, wherein said V-shaped cam surface opens generally toward the pivot axis.

6. The invention of claim 5, wherein said cam follower shifts generally away from the member's pivot axis for abutting the cam surface as the vehicle brake is applied and thereby pivots the member to a neutral position.

7. A hydrostatic transmission control mechanism for a vehicle, comprising:
 a hand lever engagable by an operator for controlling the speed of the vehicle,
 a member mounted to the vehicle for pivotal motion for selectively adjusting the speed of the vehicle as the operator shifts the hand lever, and having cam surfaces formed therein which generally converge to define a V shape, said hand lever being mounted directly to and supported by said member,
 a portion of said member being operatively coupled with an input to the hydrostatic transmission for transmitting the pivotal motion of the member to the transmission input for adjusting the speed of the vehicle,
 a slot formed in the member and having an opening formed where said first and second surfaces generally converge, said first and second surfaces terminating at the opening of the slot,
 a brake engagable by the operator for braking the vehicle, and
 a cam follower coupled with the brake linkage and being linearly shiftable for engaging the cam surfaces of the member for returning the member to a neutral position when the brake is engaged, wherein said cam follower enters the opening of the slot when the member has pivoted to the neutral position.

8. The invention of claim 7, and further comprising a linkage extending between the member and the input to the hydrostatic transmission, said linkage serving to transmit the pivotal motion of the member to the transmission input for adjusting the speed of the vehicle.

9. The invention of claim 7, wherein at least one of said cam surfaces is generally curved to define a generally concave cam surface.

10. The invention of claim 9, wherein the pivoted position of the member controls the velocity of the vehicle, and said curvature of the concave cam surface serves to allow a relatively small amount of force be applied by the cam follower to shift the member out of its positions corresponding to high velocities.

11. The invention of claim 10, wherein said curvature of the concave cam surface serves to establish a relatively large effective lever arm extending between the member's pivot axis and the direction of force applied to the cam surface by the cam follower when the member is in positions corresponding to high vehicle velocity.

12. The invention of claim 7, wherein said cam surfaces define a generally V-shaped cam surface which opens generally toward the pivot axis.

13. The invention of claim 12, wherein said cam follower shifts generally away from the member's pivot axis and abuts the cam surface as the vehicle brake is applied and thereby pivots the member to a neutral position.

14. The invention of claim 13, and further comprising a plate having a linearly extending slot formed therein, said cam follower being generally confined within said slot for defining a linear path of motion of the cam follower.

15. The invention of claim 7, and further comprising a plate having a linearly extending slot formed therein, said cam follower being generally confined within said slot for defining a linear path of motion of the cam follower.

* * * * *